(12) United States Patent
Tonami et al.

(10) Patent No.: US 9,766,129 B2
(45) Date of Patent: Sep. 19, 2017

(54) INFORMATION PROCESSING APPARATUS, HUMAN PRESENCE DETERMINING METHOD, AND RECORDING MEDIUM STORING DETERMINING PROGRAM

(71) Applicants: Kazunari Tonami, Kanagawa (JP); Yuji Ohue, Kanagawa (JP); Seiji Miyawaki, Kanagawa (JP); Kiriko Chosokabe, Tokyo (JP); Akiyoshi Nakai, Kanagawa (JP); Hideaki Iijima, Kanagawa (JP); Tetsuyoshi Nakata, Kanagawa (JP)

(72) Inventors: Kazunari Tonami, Kanagawa (JP); Yuji Ohue, Kanagawa (JP); Seiji Miyawaki, Kanagawa (JP); Kiriko Chosokabe, Tokyo (JP); Akiyoshi Nakai, Kanagawa (JP); Hideaki Iijima, Kanagawa (JP); Tetsuyoshi Nakata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/270,249

(22) Filed: Sep. 20, 2016

(65) Prior Publication Data
US 2017/0097264 A1    Apr. 6, 2017

(30) Foreign Application Priority Data
Oct. 6, 2015 (JP) .................. 2015-198537

(51) Int. Cl.
*G01J 5/02* (2006.01)
*G01J 5/00* (2006.01)
(Continued)

(52) U.S. Cl.
CPC .............. *G01J 5/0025* (2013.01); *G01J 5/12* (2013.01); *G01V 8/10* (2013.01)

(58) Field of Classification Search
CPC ... G06Q 10/063116; G01V 8/10; G08B 13/19
See application file for complete search history.

(56) References Cited

U.S. PATENT DOCUMENTS 5,083,106 A * 1/1992 Kostusiak ............ G08B 25/008
                                              340/506
5,126,718 A * 6/1992 Doctor ................. G08B 13/191
                                              250/342

(Continued)

FOREIGN PATENT DOCUMENTS

| JP | 2004-360925 | 12/2004 |
|----|-------------|---------|
| JP | 2005-038326 | 2/2005  |
| JP | 2010-256045 | 11/2010 |

*Primary Examiner* — Kiho Kim
(74) *Attorney, Agent, or Firm* — Oblon, McClelland, Maier & Neustadt, L.L.P.

(57) ABSTRACT

An information processing apparatus includes circuitry that acquires a measured temperature of a target area from a measuring device, detects whether the measured temperature changes during a predetermined time period, determines whether a human exists in the target area based on the measured temperature and the detection result indicating whether the measured temperature changes during the predetermined time period, measures a duration of time in which the determination result indicating that the human exists in the target area and the detection result indicating that there is no temperature change are kept generated, and determines that there is no human in the target area even when the determination result indicates that the human exists, if the measured duration of time reaches a certain time period, the certain time period being modifiable based on history information indicating a previously generated determination result indicating whether the human exits in the target area.

14 Claims, 9 Drawing Sheets

(51) Int. Cl.
*G01J 5/12* (2006.01)
*G01V 8/10* (2006.01)

(56) References Cited

U.S. PATENT DOCUMENTS

| | | | | |
|---|---|---|---|---|
| 6,137,407 | A * | 10/2000 | Akagawa | G08B 13/19 340/541 |
| 6,384,414 | B1 * | 5/2002 | Fisher | G01J 5/08 250/339.05 |
| 2006/0038680 | A1 * | 2/2006 | Eskildsen | G08B 13/193 340/567 |
| 2009/0027574 | A1 * | 1/2009 | Edwards | G08B 13/193 349/1 |
| 2015/0120360 | A1 * | 4/2015 | Adriaenssens | G06Q 10/06311 705/7.16 |

* cited by examiner

FIG. 5

| STATUS BEFORE UPDATE | DOES TEMPERATURE CHANGE? | RELATIONSHIP BETWEEN LATEST TEMPERATURE AND ROOM TEMPERATURE | STATUS AFTER UPDATE |
|---|---|---|---|
| PRESENT | YES | - | PRESENT |
| PRESENT | NO | LATEST TEMPERATURE ≥ ROOM TEMPERATURE+1.0°C | ABSENT IF THIS STATUS CONTINUES FOR SET PERIOD OF TIME PRESENT IF THIS STATUS DOES NOT CONTINUE FOR SET PERIOD OF TIME |
| PRESENT | NO | LATEST TEMPERATURE < ROOM TEMPERATURE+1.0°C | ABSENT |
| ABSENT | YES | LATEST TEMPERATURE ≥ ROOM TEMPERATURE+1.0°C | PRESENT |
| ABSENT | YES | LATEST TEMPERATURE < ROOM TEMPERATURE+1.0°C | ABSENT |
| ABSENT | NO | - | ABSENT | ized by the following detailed description when considered in conjunction with the accompanying drawings.
INFORMATION PROCESSING APPARATUS, HUMAN PRESENCE DETERMINING METHOD, AND RECORDING MEDIUM STORING DETERMINING PROGRAM

CROSS-REFERENCE TO RELATED APPLICATION

This patent application is based on and claims priority pursuant to 35 U.S.C. §119(a) to Japanese Patent Application No. 2015-198537, filed on Oct. 6, 2015 in the Japan Patent Office, the entire disclosure of which is hereby incorporated by reference herein.

BACKGROUND

Technical Field

The present invention relates to an information processing apparatus, a human presence determining method, and a non-transitory recording medium storing a determining program.

Background Art

The known technology measures a surface temperature of an object using an infrared thermopile sensor and detects whether or not a human exists from the temperature information, and in accordance with the detection result indicating existence or non-existence of the human, automatically control on and off of a light.

However, it has been difficult to accurately distinguish between an exothermic object such as a personal computer (PC) and a human who stands still. In such case, the exothermic object may be misconceived as the human such that the status that the human exists may continue.

To cope with this issue, parameters used for detecting may be adjusted so that the exothermic object is not misconceived as the human. This adjustment, however, may sometimes cause the status that the human stands still be misconceived as a status that the human does not exist.

SUMMARY

Example embodiments of the present invention provide a novel information processing apparatus that includes circuitry that acquires a measured temperature of a target area that is measured by a measuring device, detects whether or not the measured temperature changes during a predetermined time period to generate a detection result, determines whether or not a human exists in the target area based on the measured temperature and the detection result indicating whether or not the measured temperature changes during the predetermined time period to generate a determination result, measures a duration of time in which the determination result indicating that the human exists in the target area and the detection result indicating that there is no temperature change are kept generated, and determines that there is no human in the target area even when the determination result indicates that the human exists, if the measured duration of time reaches a certain time period, the certain time period being modifiable based on history information indicating a previously generated determination result indicating whether the human exists in the target area.

Further example embodiments of the present invention provide a human presence determining method and a non-transitory recording medium storing a determining program.

BRIEF DESCRIPTION OF THE DRAWINGS

A more complete appreciation of the disclosure and many of the attendant advantages thereof will be readily obtained as the same becomes better understood by reference to the following detailed description when considered in conjunction with the accompanying drawings.

FIG. 5 is a diagram illustrating a determining method that determines whether or not a human exists as an embodiment of the present invention;

Figure 1:
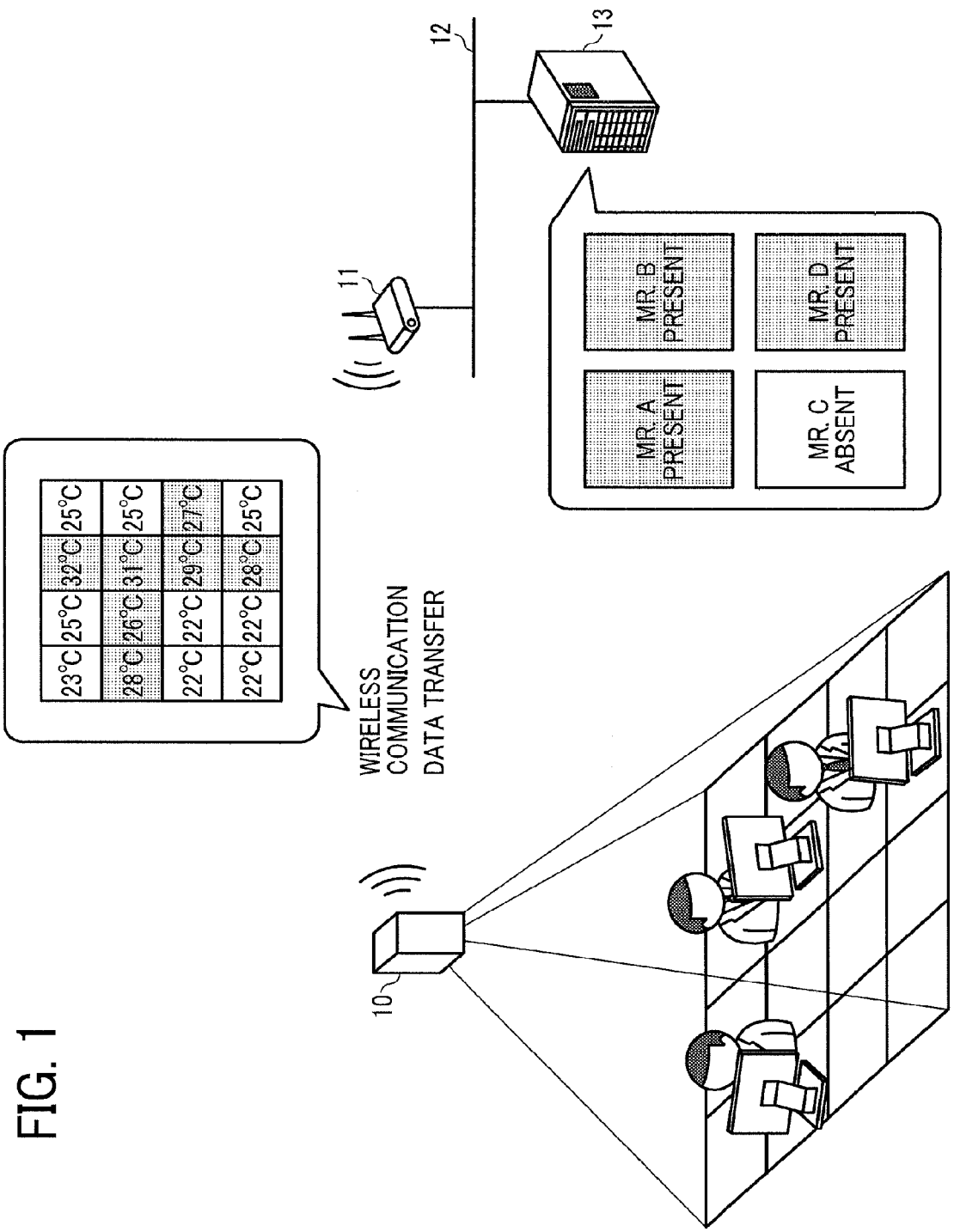
FIG. 1 is a diagram illustrating a human detection system as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

Embodiments of the present invention are described below in detail with reference to figures. In figures, same symbols are assigned to same or corresponding parts, and their descriptions are simplified or omitted appropriately.

FIG. 1 is a diagram illustrating a human detection system in this embodiment. The human detection system includes a sensor module 10 including a sensor as a measurement device that measures the temperature of a target area. In addition, the human detection system of FIG. 1 includes a wireless gateway (GW) 11 that wirelessly communicates with the sensor module 10 to receive temperature data detected by the sensor module 10. The wireless GW 11 is connected to a control server 13 as an information processing apparatus via a wired network 12 and functions as a relay apparatus that relays communication between the sensor module 10 and the control server 13. The control server 13 may be implemented by a general-purpose computer.

The sensor included in the sensor module 10 is a thermopile sensor that measures surface temperature of an object in the target area using infrared. The thermopile sensor is mounted on the ceiling in the target area while facing downward. For example, the lower (bottom) surface of the thermopile sensor is divided into four-by-four rectangular areas (meshes) to measure the surface temperature of the target area in units of the divided mesh. The division of the meshes is not limited to four by four, and the division of the meshes may be finer such as eight by eight and sixteen by sixteen etc. The surface temperature is measured for each mesh, and the temperature data of the measured surface temperature is transferred to the wireless GW 11 using wireless communication. Here, the thermopile sensor capable of measuring the entire target area is used as an example. Any other desired sensor may be used, such as a sensor that measures temperature of a specific area.

The wireless GW 11 transfers the received temperature data to the control server 13 via the wired network 12. The control server 13 performs an algorithmic processing on the received temperature data to determine whether or not a human exists in any mesh of the target area. Based on the determination result, the control server 13 controls a light so that a light laid out on an area where a human exist is turned on and a light laid out on an area where a human does not exist is turned off to save energy. It should be noted that the apparatus to be controlled is not limited to the light, and air conditioners and fans may also be controlled.

In FIG. 1, in any one of 16 meshes, 26° C. is regarded as a threshold value. Accordingly, the control server 13 determines that a human exists (present status) if the measured temperature is equal to or more than 26° C., and a human does not exist (absent status) if the measured temperature is less than 26° C. In this example illustrated in FIG. 1, the control server 13 determines that Mr. A, Mr. B, and Mr. D are each present from the meshes indicating the present status, and Mr. C is absent from the mesh indicating the absent status, and visually displays the determination result. The determination result may be displayed on a display, etc.

Figure 2:
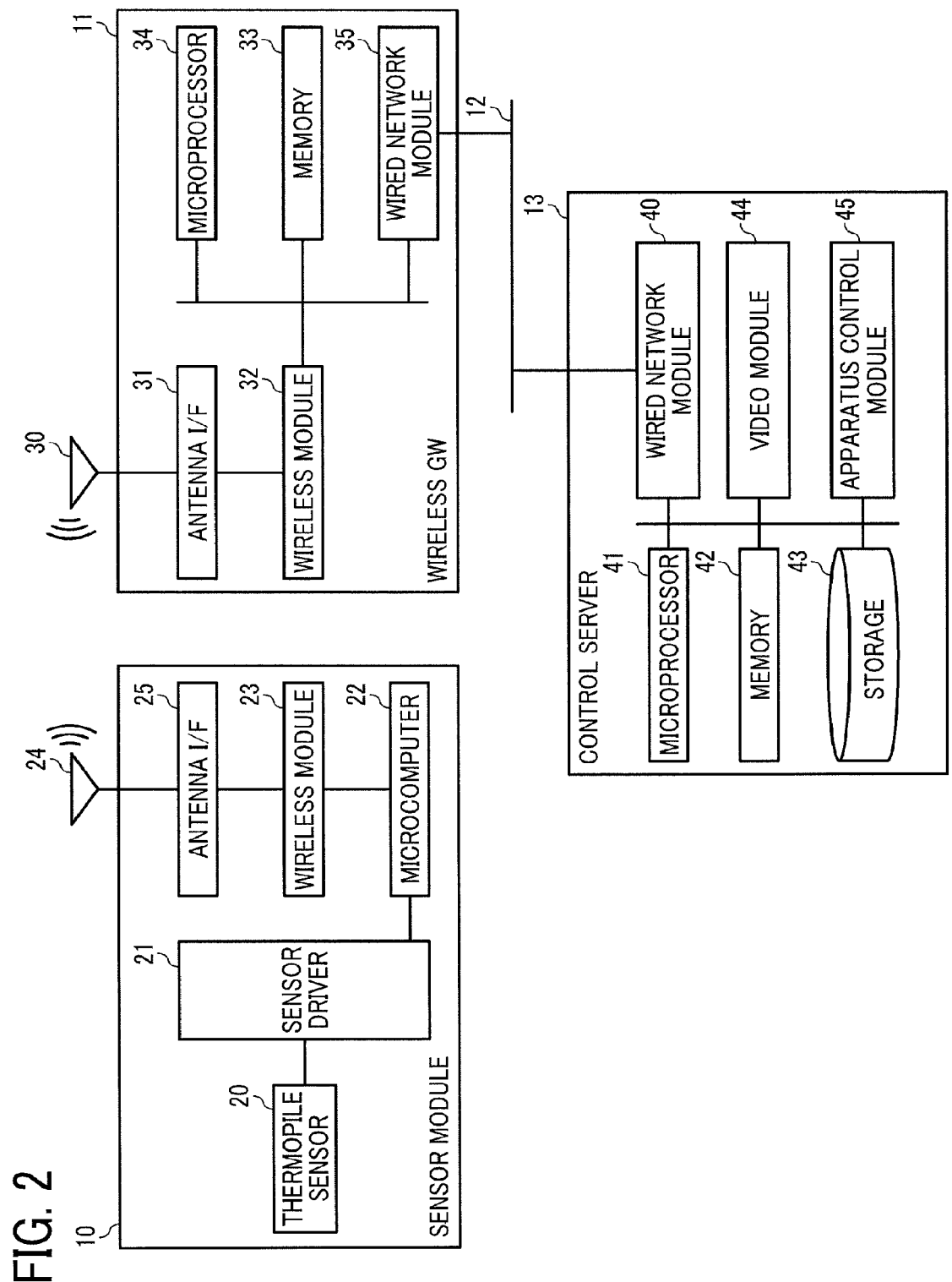
FIG. 2 is a diagram illustrating a hardware configuration and software configuration of a sensor module, wireless gateway (GW), and control server as an embodiment of the present invention.

FIG. 2 is a diagram illustrating a hardware configuration and software configuration of the sensor module 10, wireless gateway (GW) 11, and control server 13 in this embodiment.

The sensor module 10 includes a thermopile sensor 20 as a sensor and a sensor driver 21 that drives the thermopile sensor 20 to operate the thermopile sensor 20. The sensor driver 21 is controlled by a microcomputer 22. The microcomputer 22 acquires the temperature data detected and measured by the thermopile sensor 20 and passes the temperature data to the wireless module 23.

In transferring the temperature data using wireless communication, the wireless module 23 converts the temperature data into packets of data in compliance with a wireless communication protocol and transfers the packets to the wireless GW 11. In transferring the packets, the wireless module 23 transfers the packets using a radio wave via an antenna 24. The wireless module 23 is connected to the antenna 24 via an antenna interface (I/F) 25.

Just like the sensor module 10, the wireless GW 11 includes an antenna 30, an antenna I/F 31, and a wireless module 32. The wireless GW 11 receives the packets described above using the antenna 30 and passes the packets to the wireless module 32 via the antenna I/F 31. The wireless module 32 converts the packets in the wireless communication protocol into the temperature data and stores the obtained temperature data in a memory 33 at least temporarily.

The wireless GW 11 further includes the memory 33 described above, a microprocessor 34, and a wired network module 35. For example, the microprocessor 34 packs multiple temperature data, which are transferred by the thermopile sensor 20 one packet by one packet in a period of one second and transfers the packed temperature data to the control server 13 via the wired network 12.

Just like the wireless GW 11, the control server 13 includes a wired network module 40, a microprocessor 41 and a memory 42. In addition, the control server 13 includes a storage (database) 43, a video module 44, and an apparatus control module 45. The wired network module 40 receives multiple temperature data from the wireless GW 11 via the wired network 12. The multiple temperature data is stored in the storage 43.

The microprocessor 41 determines whether or not a human exists in each area using the received multiple temperature data and reports the determination result to the video module 44 and the apparatus control module 45. The video module 44 visually displays the reported result such as "present" and "absent" as illustrated in FIG. 1. The apparatus control module 45 controls an operating state of each apparatus in accordance with whether or not a human exists. In case of determining that a human is present, the apparatus control module 45 turns on a light, and in case of determining that a human is absent, the apparatus control module 45 turns off a light.

Figure 3:
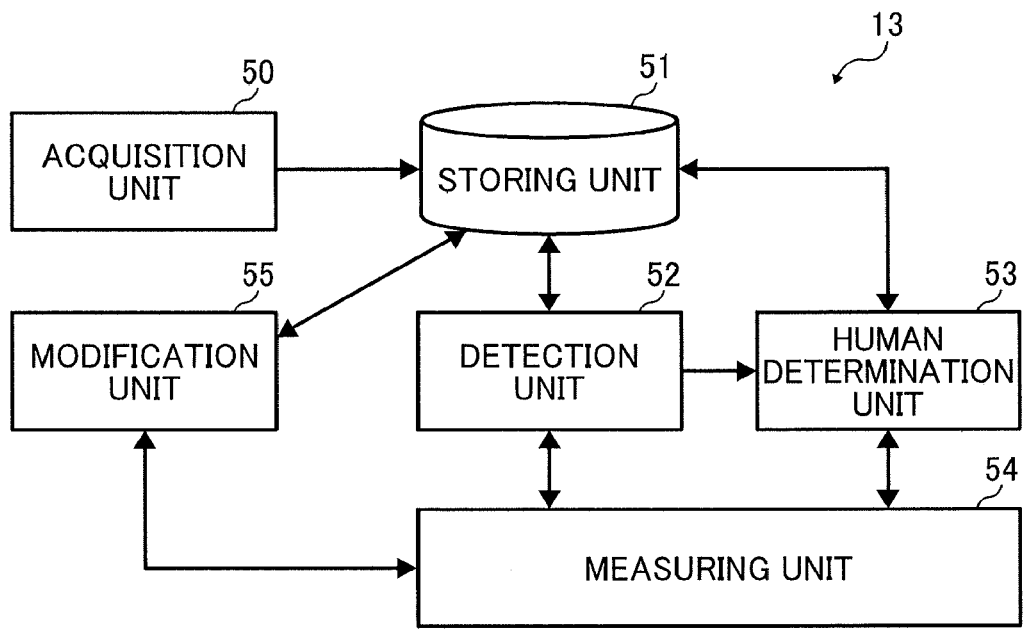
FIG. 3 is a diagram illustrating functional blocks of the control server as the first embodiment of the present invention.

FIG. 3 is a diagram illustrating functional blocks of the control server 13 in FIG. 2 implemented by hardware and software in this embodiment. The control server 13 includes an acquisition unit 50, a storing unit 51, a detection unit 52, a human determination unit (a human determining unit) 53, a measuring unit 54, and a modification unit 55 as functional blocks. These functional blocks are implemented by executing a program stored in the storage 43 by the microprocessor 41. In this embodiment, the control server 13 includes the storing unit 51. However, the control server 13 may not include the storing unit 51 in other embodiments.

The acquisition unit 50 acquires temperature (i.e., temperature data) from the thermopile sensor 20 as the measuring device that measures temperature in the target area. The storing unit 51 stores the temperature data acquired by the acquisition unit 50 in the memory. The detection unit 52 detects temperature changes within a predetermined time period based on the temperature data stored in the storing unit 51. The detection unit 52 detects recent temperature changes from a predetermined time to a current time as the predetermined time period.

If a human moves in an area, the temperature measured by the thermopile sensor 20 changes as time passes, and the detection unit 52 may detect the temperature change. By contrast, if a human stands still or a human does not exist, the temperature measured by the thermopile sensor 20 hardly changes as time passes, and the detection unit 52 may detect that there is no temperature change. The temperature varies to a degree depending on outside air temperature and whether or not a heat generating object exists. Therefore, it may be considered that there is no temperature change if the temperature varies within a certain temperature range, and it may be considered that there is a temperature change if the temperature varies beyond the certain temperature range. For example, the certain temperature range may be configured as ±0.2° C. etc. so that it may be detected that a human exists appropriately.

The human determination unit 53 determines whether or not a human exists in the target area based on the temperature data stored in the storing unit 51 and the detection result by the detection unit 52. A human does not always move in an area but stands still in some cases. If a human stands still, the temperature change is not detected by the detection unit 52. As a result, determination using only the detection result may lead to wrong determination. To cope with this issue, the human determination unit 53 sets a threshold to be used for determining whether or not a human exists. Specifically, the human determination unit 53 obtains a threshold value based on a measured temperature in an area whose human existence status is absent, and compares the latest acquired temperature with the threshold.

More specifically, if an area has been determined that a human is present so far and the measured temperature in that area is maintained at a temperature equal to or higher than the above-described threshold value in the determination this time, the human determination unit 53 determines that a human is present in that area even if the detection unit 52 detects that there is no temperature change. That is, the human determination unit 53 determines that the human stands still. Alternatively, if an area has been determined that a human is absent so far and the measured temperature in that area is less than the above-described threshold value in the determination this time, the human determination unit 53 determines that a human is absent in that area even if the detection unit 52 detects a temperature change. That is, the human determination unit 53 determines that the temperature does not reach a sufficient temperature reflecting the human existence, thus, determines that the human does not exist in the area.

If determination is made only based on the threshold value as described above, if a human leaves a heat generating object behind in the area, the temperature is maintained at a temperature equal to or higher than the above-described threshold value, leading to a wrong determination that a human continues to exist while the human is absent. As a result, while a light may be turned off and energy may be saved under normal circumstances, the light is kept turned on causing a waste in electrical energy in some cases.

Therefore, the measuring unit 54 is included to avoid maintaining the wrong determination. The measuring unit 54 measures time period that the human determination unit 53 keeps determining that a human exists and the detection unit 52 keeps detecting that there is no temperature change (i.e., the measuring unit 54 measures a time period when the status that a human exists and temperature does not change is kept). If the time period measured by the measuring unit 54 reaches a certain time period, the human determination unit 53 determines that a human does not exist in the area. As a result, even if it is wrongly determined that a human exists, it may be correctly modified that a human does not exist after the certain time period. The certain time period may be previously set so that the absent status may be determined correctly.

If the human determination unit 53 determines that a human does not exist in the area, a light is turned off. If the human determination unit 53 detects movements of the human body, the light is turned on again. In some cases, however, the human determination unit 53 may determine that a human stands still over the certain time period, irrespective of movements of the human body. For example, if the thermopile sensor 20 measures a surface temperature of a back of a human who is holding a pen, even when that pen is being moved, it may be determined that the human stands still as the pen is blocked by the back of the human. In another example, if the leg of the human is behind a desk, it may be determined that the human stands still as the leg is blocked. If it is determined that the human stands still and a certain time period passes, the human determination unit 53 determines that a human does not exist.

The modification unit 55 modifies the certain time period referred by the human determination unit 53 based on history information of results determined by the human determination unit 53. As a result, the certain time period described above may be prolonged, and the number of operations of turning on and off the lights is reduced. In addition, the number of wrong determination that determines the state in which the human stands still as the absent status is reduced. For example, the determination results by the human determination unit 53 may be stored in the storing unit 51, and the modification unit 55 may modify the length of the certain time period by using the stored determination results as the history information. Here, an initial value is preliminarily set to the certain time period, and the modification unit 55 updates the certain time period based on the history information.

Figure 4:
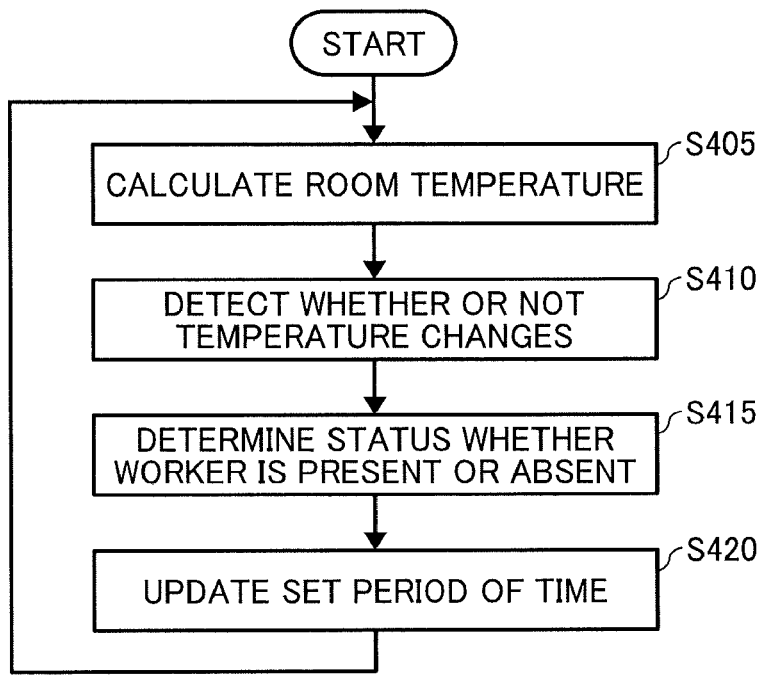
FIG. 4 is a flowchart illustrating an operation of determining whether or not a human exists performed by the control server as an embodiment of the present invention.

An operation of determining whether or not a human exists, performed by the control server 13 including the functional units described above, is described below in detail with reference to FIG. 4 according to the embodiment. After starting the operation, the acquisition unit 50 acquires temperature data corresponding to each of four-by-four meshes for example from the thermopile sensor 20. The acquired temperature data is stored in the storing unit 51. In S405, a temperature of a room (an example of the target area) is calculated by using the temperature data stored in the storing unit 51. The control server 13 has a function of calculating the room temperature.

The room temperature may be calculated by either averaging the measured temperatures of the meshes that are determined as absent. Alternatively, the room temperature may be set to the lowest temperature among the measured temperatures of the four-by-four meshes. Alternatively, a temperature may be previously measured when there is no human in each of the four-by-four meshes. The measured temperatures are then averaged to calculate the room temperature. Other known methods may be used for calculating the room temperature.

In S410, the detection unit 52 detects whether or not the temperature varies within the predetermined time period from the temperature data stored in the storing unit 51. For example, for each mesh, if the temperature data during the last five seconds falls within the predetermined temperature range, the detection unit 52 determines that there is no temperature change. By contrast, for each mesh, if the temperature data during the last five seconds varies beyond the predetermined temperature range, the detection unit 52 determines that there is temperature change. For example, a difference between a maximum value and a minimum value in the temperature data described above is calculated as a temperature change amount. If the temperature change amount is equal to or larger than a predetermined threshold value, it may be determined that there is a temperature change. If the temperature change amount is less than the predetermined threshold value, it may be determined that there is no temperature change. The predetermined threshold value may be determined based on a temperature change amount generated when a human moves a body.

The predetermined threshold value may be set to 0.5° C., depending on a height where the thermopile sensor 20 is located, i.e., a detection area of one mesh. The predetermined threshold value may be configured as other temperature e.g., 1° C. etc. In addition, the method of detecting the temperature change is not limited to the method described above, and other known methods may be adopted.

In S415, the human determination unit 53 determines a status indicating whether or not a human exists in each mesh based on the room temperature calculated in S405, the detection result of whether or not there is a temperature change detected in S410, and the latest temperature data, and updates the status of each mesh. The determination of the status is described below in detail.

In S420, the measurement unit 54 measures a time period during which the human present status and the no temperature change status continue. If the time period measured by the measurement unit 54 reaches the certain time period, the human determination unit 53 transitions the status from the present status to the absent status. Subsequently, based on the history of results of determining statuses, i.e., history of the transitions, the modification unit 55 modifies the length of the certain time period. After that, the operation goes back to S405 again, and the operation described above is repeated.

For example, the operation from S405 to S420 is repeatedly performed at intervals of one second to determine whether or not a human exists. Shorter time interval as possible is preferable since the apparatus may be controlled with more accuracy.

The determination of the statuses described above is described below in detail with reference to FIG. 5. In FIG. 5, "status before update" indicates a status whether or not a human exists before updating the status this time. The temperature change occurs when a human enters into a room or a heat generating object is brought into a room, when a human leaves from a room or a heat generating object is taken from a room, when an apparatus that generates heat while operating is turned on, when an apparatus that generates heat while operating is turned off, and when a human moves etc. "Relationship between latest temperature and room temperature" indicates whether or not the latest temperature is equal to or larger than a value obtained by adding a predetermined temperature to the room temperature. In this case, 1° C. is configured as the predetermined temperature. "Status after update" indicates a status whether or not a human exists after updating the status.

If the status before update indicates the human presence and there is a temperature change, it is determined that a human exists and the human moves. As a result, the status after update is determined as present. By contrast, if the status before update indicates human presence and there is no temperature change, it is determined that a human exists and the human stands still, a human leaves and a heat generating object exists, or a human leaves and there is no heat generating object in the room. To make determination, it is determined whether or not the latest temperature is equal to or larger than the threshold value described above. If the latest temperature is less than the threshold value described above, it is determined that there is no heat generating object in the room and a human has left the room. As a result, the status after update is determined as absent.

If the latest temperature is equal to or larger than the threshold value described above, the determination is made based on whether or not the present status and the no temperature change status continue for the certain time period. If this status continues over the certain time period, it is determined that a human has left the room and a heat generating object remains. As a result, the status after update is determined as absent. If the status does not continue over the certain time period, it is determined that a human who stood still has moved. As a result, the status after update is determined as present.

By contrast, if the status before update is absent and there is a temperature change, it is determined that a human enters into the room. Alternatively, it is determined that the room temperature changes due to a cause other than entrance of a human. To make determination, it is determined whether or not the latest temperature is equal to or larger than the threshold value obtained by adding the predetermined temperature to the room temperature. If the latest temperature is equal to or larger than the threshold value, it is determined that a human enters into the room, and the status after update is determined as present. By contrast, if the latest temperature is less than the threshold value, it is determined that the status is due to a cause other than entrance of a human, and the status after update is determined as absent.

If the status before update is absent and there is no temperature change, it is determined that there is no one in the room and a human does not enter the room, and the status after update is determined as absent.

Figure 6:
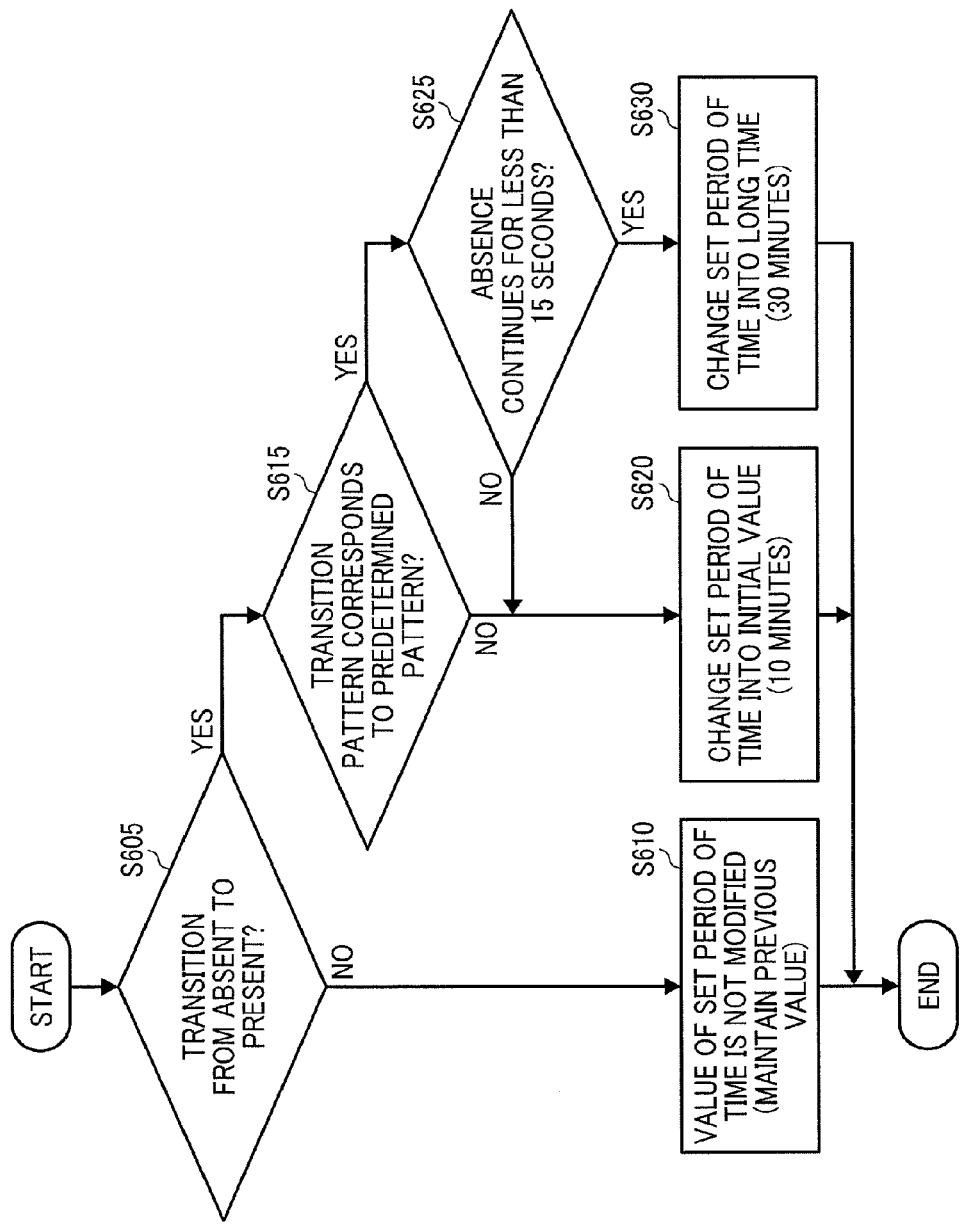
FIG. 6 is a flowchart illustrating an operation of modifying a length of a certain period of time as an embodiment of the present invention.

An operation of modifying the certain time period described above based on the transition history of status indicating presence or absence is described below in detail with reference to FIG. 6. After starting the operation, in S605, it is determined whether or not the status transitions from absent to present. If the status does not transition in that way, the operation proceeds to S610, and the length of the certain time period is not modified. That is, the previous value is maintained.

If the status transitions from absent to present, the operation proceeds to S615 to refer to the transition history, and it is determined whether or not a transition pattern indicated by the transition history corresponds to a predetermined pattern. In this case, for example, the predetermined pattern transitions from present, absent after reaching the certain time period described above, and to present in sequence. If the transition pattern does not correspond to the predetermined pattern, the operation proceeds to S620, and an initial value is configured as the certain time period. In this case, the initial value is set to 10 minutes. For example, the transition pattern does not correspond to the predetermined pattern if a human leaves a room and reenters into the room.

If the transition pattern corresponds to the predetermined pattern, the operation proceeds to S625, and it is determined whether or not a duration of absent is shorter than a designated time period, e.g., shorter than 15 seconds. If the duration is equal to or longer than 15 seconds, the operation proceeds to S620. If the duration is less than 15 seconds, the operation proceeds to S630. For example, the duration becomes shorter than 15 seconds if it is determined that a human does not exist, lights are turned off, and the human moves a body to turn on the lights again. In S630, the certain time period is modified to a longer value to avoid determining as absent even if the status that a human stands still continues subsequently. Whatever value longer than the initial value (e.g., 30 minutes) may be used in this case. After updating the certain time period, the operation ends. It should be noted that the longer value is not limited to a value longer than the initial value and the longer value may be configured as a value longer than the current value.

Figure 7:
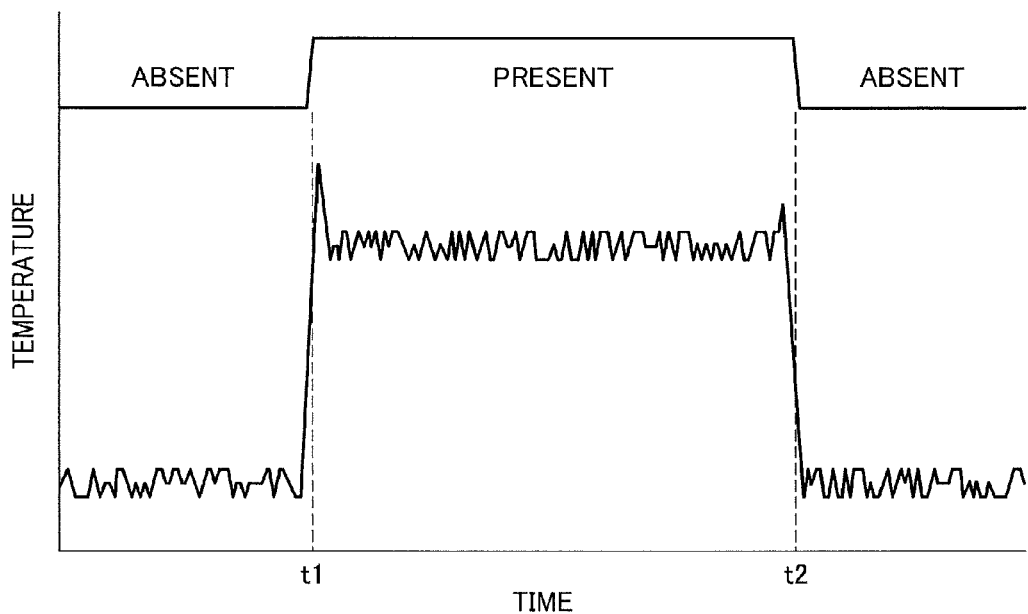
FIG. 7 is a diagram illustrating a result of determining statuses that a human enters, stands still, and leaves as an embodiment of the present invention.

The operation of determining the status is considered as a first method, and the first method is described below in detail using examples of specific temperature and detection results. For example, in the first method, a case that a human enters into a room, the human stands still, and the human leaves from the room is considered. FIG. 7 is a diagram illustrating temperature data of the thermopile sensor 20 for each instant of time and results of determining a status (i.e., present or absent) in this embodiment.

Since the temperature is almost the same as the room temperature until time t1, the status is determined as absent. At time t1, someone enters and the temperature rises by equal to or more than the predetermined temperature (e.g., equal to or more than 1° C.) compared to the room temperature. As a result, the status is determined as present. From time t1 to t2, the temperature is kept high equal to or more than the predetermined temperature compared to the room temperature. Time from t1 to t2 fits into the certain time period described above. The status is kept determining as present during that time period. At time t2, the temperature drops and goes back to the previous room temperature. Since it is estimated that someone leaves, the status is determined as absent.

In this case, someone leaves before the certain time period passes. If someone moves a body etc. during the time period from t1 to t2 and it is detected that there is temperature change, the duration of no temperature change is reset, and it is started to measure the duration just after there is no temperature change again. As a result, if a human moves only once during the certain time period, it may be avoided to determine the status as absent wrongly.

Figure 8:
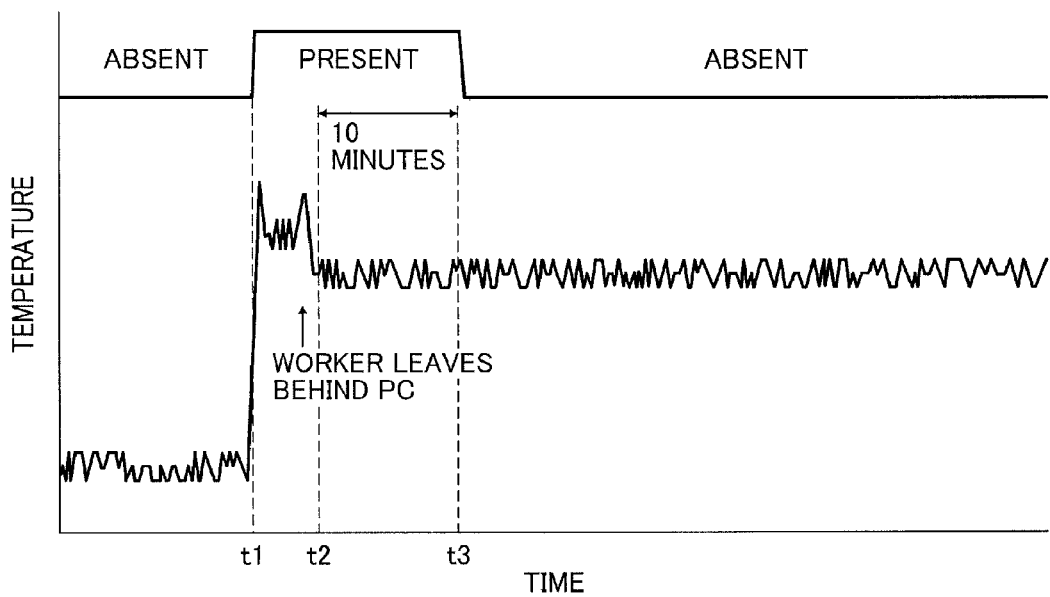
FIG. 8 is a diagram illustrating a result of determining statuses that a human enters with an exothermic object and leaves the exothermic object behind as an embodiment of the present invention.

As another example in the first method, a case that a human enters into a room holding a heat generating object and leaves the heat generating object behind is described below. In this case, the heat generating object is a PC. Just like FIG. 7, FIG. 8 is also a diagram illustrating temperature data of the thermopile sensor 20 for each instant of time and results of determining a status (i.e., present or absent) in this embodiment.

Since the temperature is almost the same as the room temperature until time t1, the status is determined as absent. At time t1, someone enters holding the PC and the temperature rises by equal to or more than the predetermined temperature compared to the room temperature. As a result, the status is determined as present. At time t2, the human leaves behind the PC. As a result, while the temperature drops a bit, the temperature is still kept high equal to or more than the predetermined temperature compared to the room temperature. As a result, the status is maintained as present at time t2. After time t2, the surface temperature of the PC hardly changes, and the temperature data of the thermopile sensor 20 transitions at almost certain temperature.

At time t3 after the certain time period passes from time t2, the present status is maintained and the status that there is no temperature change is maintained. Therefore, the status is determined as absent at time t3, and the present status transitions into the absent status.

From time t2 to time t3, the status that only the heat generating object stays is determined as present wrongly. For example, the certain time period is set to 10 minutes. If the status continues for 10 minutes, the status is determined as absent correctly. As a result, even if a human does not exists and only the heat generating object stays, it may be avoided to keep determining the status as present wrongly for a long time.

Figure 9:
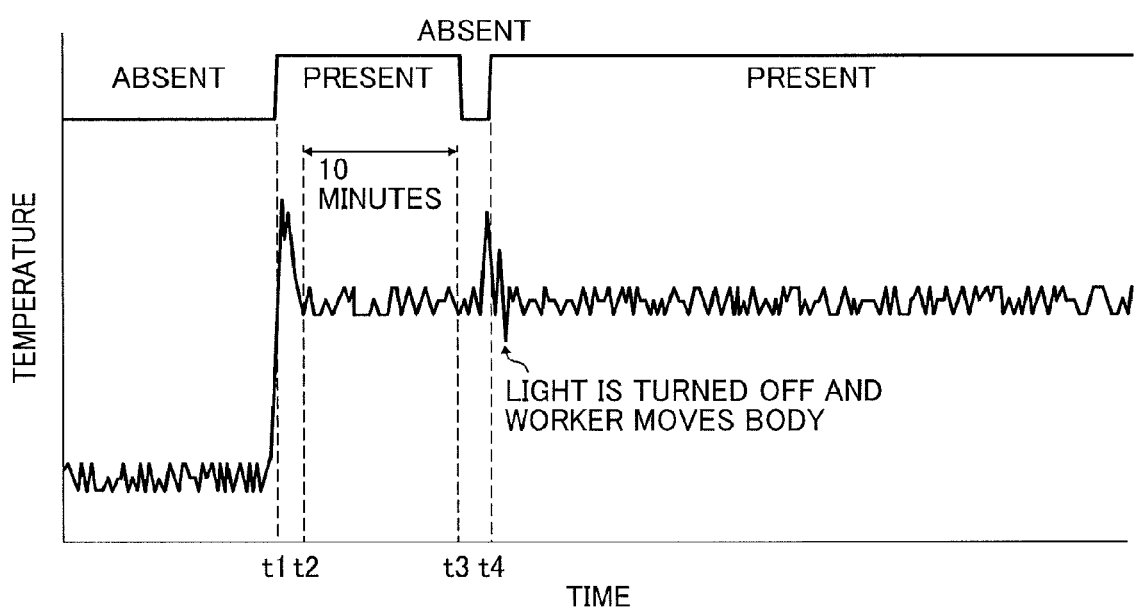
FIG. 9 is a diagram illustrating a result of determining statuses that a human enters and stands still for a long time as an embodiment of the present invention.

For example, in the first method, a case that a human enters into a room, and the human stands still for a long time is considered. Just like FIGS. 7 and 8, FIG. 9 is also a diagram illustrating temperature data of the thermopile sensor 20 for each instant of time and results of determining a status (i.e., present or absent) in this embodiment.

Since the temperature is almost the same as the room temperature until time t1, the status is determined as absent. At time t1, someone enters and the temperature rises by equal to or more than the predetermined temperature compared to the room temperature. As a result, the status is determined as present. Subsequently, the human stands still, and the status becomes present and no temperature change at time t2. Therefore, it is started to measure a duration of that status. At time t2, the human stands still, and the temperature is kept high equal to or more than the predetermined temperature compared to the room temperature. As a result, the status is maintained as present at time t2.

At time t3 after the certain time period passes from time t2, the present status is maintained and the status that there is no temperature change is maintained. Therefore, the status is determined as absent at time t3, and the present status transitions into the absent status. After transitioning into the absent status, the apparatus is controlled so that lightings are turned off.

In this case, the human stands still. Therefore, in order to turn lightings on, the human moves a body immediately at time t4. The human moves the body, and temperature change occurs. Therefore, the status is determined as present, and the status transitions from absent to present. In this case, if the human stands still again, after 10 minutes passes, the status transitions into absent and lightings are turned off. To cope with this issue, the length of the certain time period is modified into a longer time period such as 30 minutes. As a result, after time t4, the present status is maintained until the present status and no temperature change status continue for 30 minutes. Therefore, frequencies that the status is determined as absent wrongly may be reduced substantially.

FIG. 8 is a diagram illustrating a case that the human enters holding the heat generating object and leaves the heat generating object behind. In this case, after the human leaves and the certain time period passes, the status transitions from present to absent. Regarding the area measured by the thermopile 20, in addition to a human who uses the area for working etc., someone only passes by the area. If someone who only passes by passes by the area, the temperature rises by temperature equal to or more than the predetermined temperature compared to the room temperature. As a result, someone is detected and the status transitions into present. Subsequently, after the certain time period passes, the status transitions into absent. If the initial value of the certain time period is set to 10 minutes, the status is determined as present wrongly for 10 minutes long regardless there is no human, and lightings are kept turned on. This is waste of electrical energy.

Figure 10:
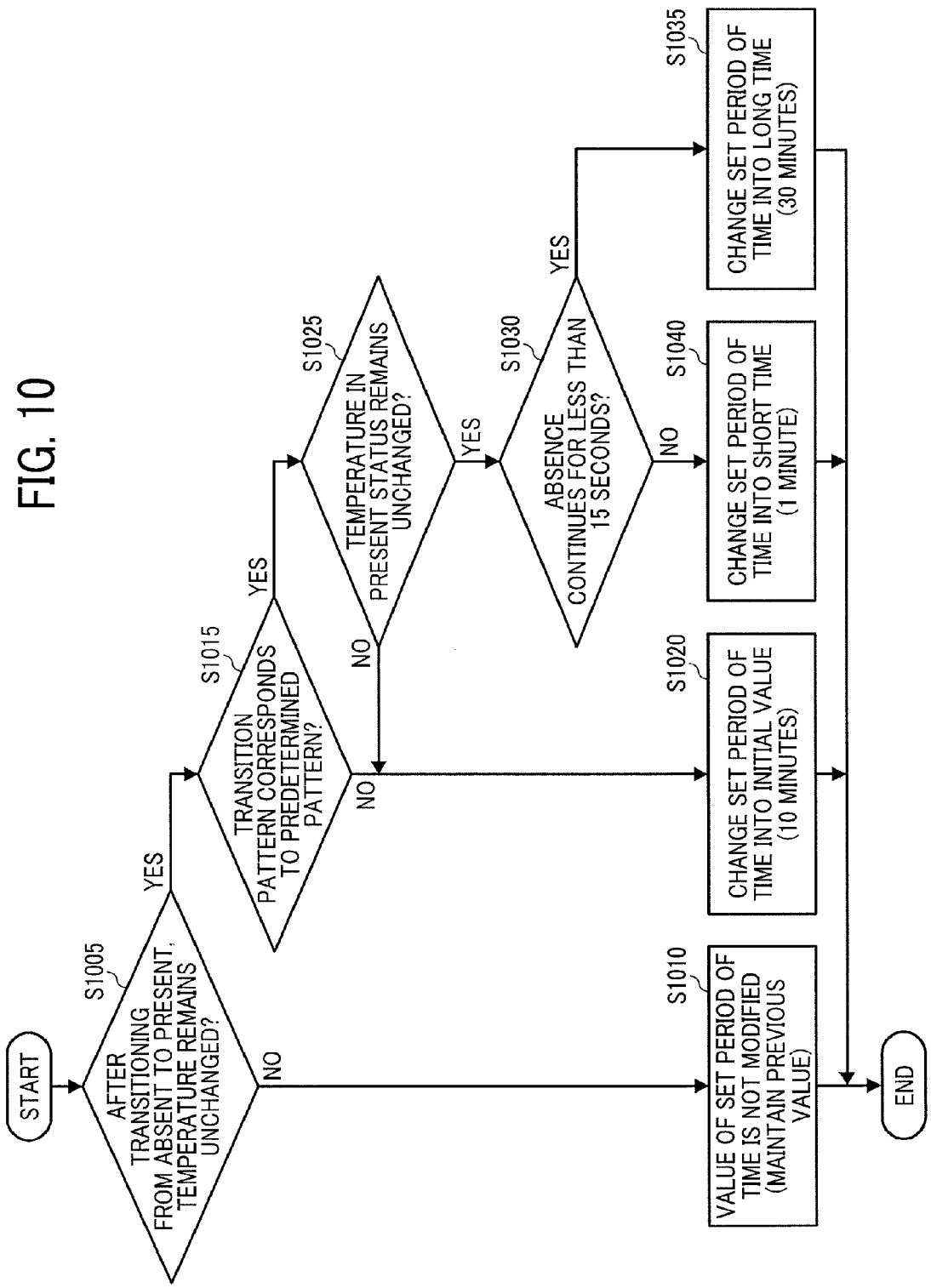
FIG. 10 is a flowchart illustrating an operation of modifying a length of a certain period of time as an embodiment of the present invention.
Figure 11:
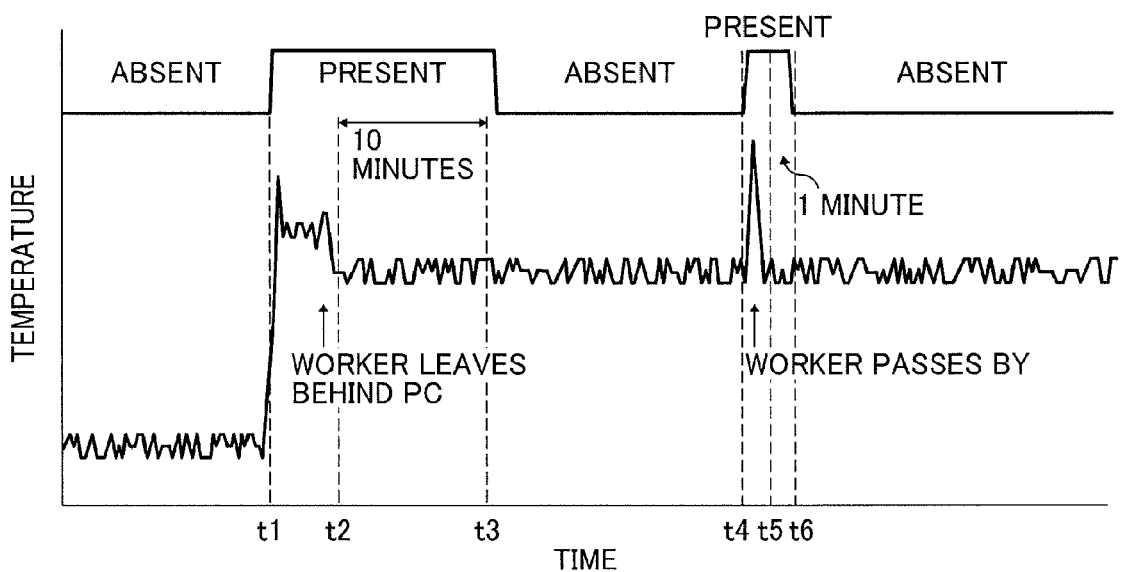
FIG. 11 is a diagram illustrating a result of determining statuses that a human enters with an exothermic object and leaves the exothermic object behind and another human passes as an embodiment of the present invention.
Figure 12:
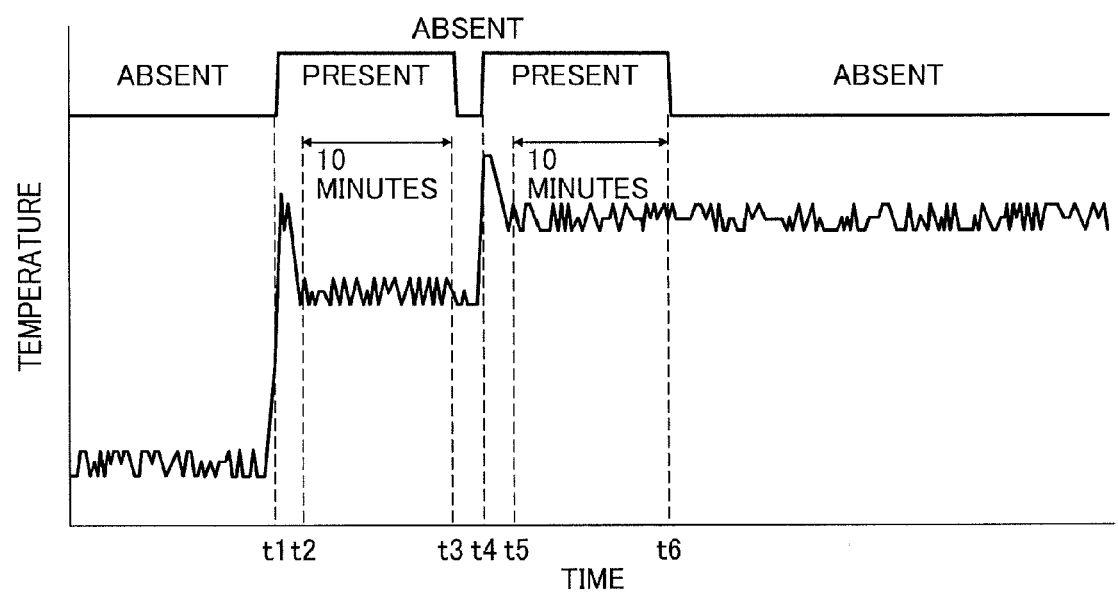
FIG. 12 is a diagram illustrating a result of determining statuses that a human enters, turns on the exothermic object to generate heat, and leaves as an embodiment of the present invention.

To cope with this issue, it is determined whether or not a human only passes by. If the human only passes by, it is preferable to shorten the certain time period and determine the status as absent earlier. FIG. 10 is a flowchart illustrating an operation of modifying a length of the certain time period to cope with the issue described above in this embodiment. The operation from S1000 to S1020 in FIG. 10 is almost similar to the operation from S600 to S620 illustrated in FIG. 6. It should be noted that, in S1005, in addition to transition from absent to present, it is also determined whether or not there is no temperature change. To determine whether or not there is no temperature change, it is determined whether or not the temperature varies within the certain temperature range and the predetermined time period passes.

In S1025, it is determined whether or not temperature values at the present status before and after the absent status, i.e., the temperature at the present status just before the status transitions into the absent status and the temperature after transitioning from absent into present and there is no temperature change, are almost the same. It is determined whether or not the temperature at the present status changes depending on the fact that the difference between the two temperatures is less than the threshold value. As a result, based on the temperature data and the history information, the information processing apparatus may include a temperature difference detection unit that detects whether or not the temperature difference between the two temperatures before and after the absent status exists.

For example, the threshold value may be set to 0.5° C. In this case, the temperature difference is less than 0.5° C., it is determined that there is no temperature change at the present status. The temperature at the present status just before the status transitions into absent may be stored and updated in the storage 43 as the temperature at the present status and referred to by reading out the data as needed. As a result, in addition to the cases that only the heat generating object exists and the human stands still, the apparatus may be controlled even in the case that it is difficult to distinguish those two cases.

In S1025, if it is determined that the temperature at the present status changes, the operation proceeds to S1020, and the length of the certain time period is modified to the initial value. This is because it is difficult to distinguish between the case that the human only passes by the area where the heat generating object exists and the case that the human who stood still moves. By setting the length of the certain time period to the initial value, it may be prevented to determine the case that the human stands still as the absent status wrongly in a small amount of time.

In S1025, if it is determined that the temperature at the present status does not change, the operation proceeds to S1030, and it is determined whether or not the duration of the absent status is less than 15 seconds. If the duration of the absent status is less than 15 seconds, it is highly possible that the human moves the body in reaction to the fact that lightings are turned off. Therefore, the operation proceeds to S1035, and the certain time period is modified into a longer time period such as 30 minutes. If the duration of the absent status is equal to or more than 15 seconds, it is highly possible that the human passes by the area where only the heat generating object exists. Therefore, the operation proceeds to S1040, and the certain time period is modified into a shorter time period such as one minute. As a result, after the human passes, if the present status and no temperature change status continue for a short time, the status is determined as absent and may be transitioned into the absent status.

The operation of determining the status described above is considered as a second method, and the second method is described below in detail using examples of specific temperature and detection results. For example, in the second method, a case that a human passes in front of a heat generating object is considered. Just like FIGS. 7 to 9, FIG. 11 is also a diagram illustrating temperature data of the thermopile sensor 20 for each instant of time and results of determining a status (i.e., present or absent) in this embodiment.

Since the temperature is almost the same as the room temperature until time t1, the status is determined as absent. At time t1, someone enters holding the PC and the temperature rises by equal to or more than the predetermined temperature compared to the room temperature. As a result, the status is determined as present. At time t2, the human leaves behind the PC. As a result, while the temperature drops a bit, the temperature is still kept high equal to or more than the predetermined temperature compared to the room temperature. As a result, the status is maintained as present at time t2. After time t2, the surface temperature of the PC hardly changes, and the temperature data of the thermopile sensor 20 transitions at almost certain temperature.

At time t3 after the certain time period passes from time t2, the present status is maintained and the status that there is no temperature change is maintained. Therefore, the status is determined as absent at time t3, and the present status transitions into the absent status.

From time t2 to time t3, the status that only the heat generating object stays is determined as present wrongly. For example, the certain time period is set to an initial value such as 10 minutes. If the status continues for 10 minutes, the status is determined as absent correctly.

When the human passes by the area at time t4, the temperature rises and it is detected that the human exists. Subsequently, the status transitions from the absent status to the present status. After the human leaves at time t5, the heat generating object still stays, and the present status is maintained. If it is not determined whether or not the human only passes, the status transitions into the absent status if the present status and no temperature change status continue for 10 minutes. However, in this case described above, if the human only passes, the status is transitioned into absent after the statuses continue for one minute.

As described above, after the human passes, the status that only the heat generating object exists is determined as the absent status in a small amount of time, and the duration that lightings are turned on may be shortened. As a result, energy may be saved more efficiently.

For example, in the second method, a case that a heat generating object enters and leaves after a human enters is considered. Just like FIGS. 7 to 9 and FIG. 11, FIG. 12 is also a diagram illustrating temperature data of the thermopile sensor 20 for each instant of time and results of determining a status (i.e., present or absent) in this embodiment.

Since the temperature is almost the same as the room temperature until time t1, the status is determined as absent. At time t1, someone enters and the temperature rises by equal to or more than the predetermined temperature compared to the room temperature. As a result, the status is determined as present. Subsequently, the human stands still, and the status becomes present and no temperature change at time t2. Therefore, it is started to measure a duration of that status. At time t2, the human stands still, and the temperature is kept high equal to or more than the predetermined temperature compared to the room temperature. As a result, the status is maintained as present at time t2.

At time t3 after the certain time period passes from time t2, the present status is maintained and the status that there is no temperature change is maintained. Therefore, the status is determined as absent at time t3, and the present status transitions into the absent status. After transitioning into the absent status, the apparatus is controlled so that lightings are turned off.

At time t4, just after lightings are turned off, the human who stood still moves, turns the PC on, and leaves. After the human moves, the temperature changes, the status is determined as present, and the status transitions from the absent status into the present status. In addition, after the PC is turned on, the PC becomes the heat generating object. Since the PC exists even after the human leaves, the present status is maintained. At time t6 after the certain time period passes from time t5, the present status is maintained and the status that there is no temperature change is maintained. Therefore, the status is determined as absent at time t6, and the present status transitions into the absent status.

In this case, the difference between the temperature at the present status at time t3 and the temperature at time t5 after returning to the present status and there is no temperature change is equal to or more than 0.5° C. for example, i.e., the temperature at the present status at time t3 is different from the temperature at time t5 after returning to the present status and there is no temperature change. As a result, regardless of the length of the duration of the absent status (i.e., the duration between time t3 to time t4), the certain time period is modified into the initial value (e.g., 10 minutes in this case) at time t5. If it is not detected that the two temperatures described above are different from each other, the certain time period may be modified into a longer value in some cases. However, by performing the determination described above and modifying the certain time period into the initial value, it may be prevented to modify the certain time period into a longer value and it may be avoided to keep determining the status as present wrongly for a long time.

In this case, the certain time period is modified into the initial value. However, whatever value with appropriate length shorter than the long time period described above and longer than the short time period described above may be used. In addition, regarding parameters such as the predetermined temperature, threshold value, and temperature difference between temperatures before and after the absent status described above, 1° C. and 0.5° C. described above are just examples. Therefore, those parameters are not limited to the values such as 1° C. and 0.5° C., and appropriate temperatures may be configured as those parameters.

In the above description, embodiments of the information processing apparatus, the human detection system, and the determination method are described. However, the present invention is not limited to those embodiments.

In the embodiments described above, a novel information processing apparatus is provided, which improves accuracy in determining a human presence.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus, comprising circuitry to:
    acquire a measured temperature of a target area that is measured by a measuring device;
    detect whether or not the measured temperature changes during a predetermined time period to generate a detection result;
    determine whether or not a human exists in the target area based on the measured temperature and the detection result indicating whether or not the measured temperature changes during the predetermined time period to generate a determination result;
    measure a duration of time in which the determination result indicating that the human exists in the target area and the detection result indicating that there is no temperature change are kept generated; and
    determine that there is no human in the target area even when the determination result indicates that the human exists, if the measured duration of time reaches a certain time period, the certain time period being modifiable based on history information indicating a previously generated determination result indicating whether the human exists in the target area.

2. The information processing apparatus according to claim 1, wherein the history information includes:
    a transition pattern indicating transitions between a present status indicating that a human exists and an absent status indicating that there is no human; and
    a duration of a time period in which the absent status is kept in transitioning between the absent status and the present status, and
    wherein the circuitry modifies the certain time period from an initial value to a value longer than the initial value if the transition pattern indicates transitions in sequence from the present status to the absent status and from the absent status to the present status, and the duration of the absent status is shorter than a configured time period.

3. The information processing apparatus according to claim 2, wherein the circuitry is further configured to calculate a temperature difference between a temperature in the present status before the absent status and a temperature in the present status after the absent status based on the measured temperature and the history information, and modify a length of the certain time period based on the temperature difference.

4. The information processing apparatus according to claim 3, wherein, when the transition pattern indicates transitions in sequence from the present status to the absent status and from the absent status to the present status, and the temperature difference is less than a threshold value, the circuitry modifies the certain time period from the initial value to a value longer than the initial value if the duration of the absent status is shorter than the configured time period, and the circuitry modifies the certain time period from the initial value to a value shorter than the initial value if the duration of the absent status is equal to or longer than the configured time period.

5. The information processing apparatus according to claim 3, wherein the circuitry sets the certain time period to the initial value if the temperature difference is equal to or more than a threshold value.

6. The information processing apparatus according to claim 1, wherein the circuitry detects that there is no temperature change if the measured temperature during the predetermined time period falls within a predetermined temperature range and detects that there is a temperature change if the measured temperature during the predetermined time period varies beyond the predetermined temperature range, and determines whether or not the human exists in the target area based on 1) a result of comparison between a value obtained by adding a predetermined temperature to a temperature being measured when there is no human in the target area and a latest acquired measured temperature and 2) the detection result indicating whether or not there is a temperature change.

7. A human detection system, comprising:

the information processing apparatus according to claims 1; and the measuring device to measure a temperature in the target area.

8. A determining method of determining presence of a human, comprising:

acquiring a measured temperature of a target area that is measured by a measuring device;

detecting whether or not the measured temperature changes during a predetermined time period to generate a detection result;

determining whether or not a human exists in the target area based on the measured temperature and the detection result indicating whether or not the measured temperature changes during the predetermined time period to generate a determination result;

measuring a duration of time in which the determination result indicating that the human exists in the target area and the detection result indicating that there is no temperature change are kept generated; and determining that there is no human in the target area even when the determination result indicates that the human exists, if the measured duration of time reaches a certain time period, the certain time period being modifiable based on history information indicating a previously generated determination result indicating whether the human exists in the target area.

9. The determining method according to claim 8, wherein the history information includes:

a transition pattern indicating transitions between a present status indicating that a human exists and an absent status indicating that there is no human; and a duration of a time period in which the absent status is kept in transitioning between the absent status and the present status, and comprising:

modifying the certain time period from an initial value to a value longer than the initial value if the transition pattern indicates transitions in sequence from the present status to the absent status and from the absent status to the present status, and the duration of the absent status is shorter than a configured time period.

10. The determining method according to claim 9, further comprising:

calculating a temperature difference between a temperature in the present status before the absent status and a temperature in the present status after the absent status based on the measured temperature and the history information; and modifying a length of the certain time period based on the temperature difference.

11. The determining method according to claim 10, wherein, when the transition pattern indicates transitions in sequence from the present status to the absent status and from the absent status to the present status, and the temperature difference is less than a threshold value, further comprising:

modifying the certain time period from the initial value to a value longer than the initial value if the duration of the absent status is shorter than the configured time period; and modifying the certain time period from the initial value to a value shorter than the initial value if the duration of the absent status is equal to or longer than the configured time period.

12. The determining method according to claim 10, further comprising:

setting the certain time period to the initial value if the temperature difference is equal to or more than a threshold value.

13. The determining method according to claim 8, further comprising:

detecting that there is no temperature change if the measured temperature during the predetermined time period falls within a predetermined temperature range and detects that there is a temperature change if the measured temperature during the predetermined time period varies beyond the predetermined temperature range, and determining whether or not the human exists in the target area based on 1) a result of comparison between a value obtained by adding a predetermined temperature to a temperature being measured when there is no human in the target area and a latest acquired measured temperature and 2) the detection result indicating whether or not there is a temperature change.

14. A non-transitory, computer-readable recording medium storing a program that, when executed by one or more processors, causes the processors to implement a determining method of determining presence of a human, comprising:

acquiring a measured temperature of a target area that is measured by a measuring device;

detecting whether or not the measured temperature changes during a predetermined time period to generate a detection result;

determining whether or not a human exists in the target area based on the measured temperature and the detection result indicating whether or not the measured temperature changes during the predetermined time period to generate a determination result;

measuring a duration of time in which the determination result indicating that the human exists in the target area and the detection result indicating that there is no temperature change are kept generated; and determining that there is no human in the target area even when the determination result indicates that the human exists, if the measured duration of time reaches a certain time period, the certain time period being modifiable based on history information indicating a previously generated determination result indicating whether the human exists in the target area.

\* \* \* \* \*